Patented Aug. 3, 1937

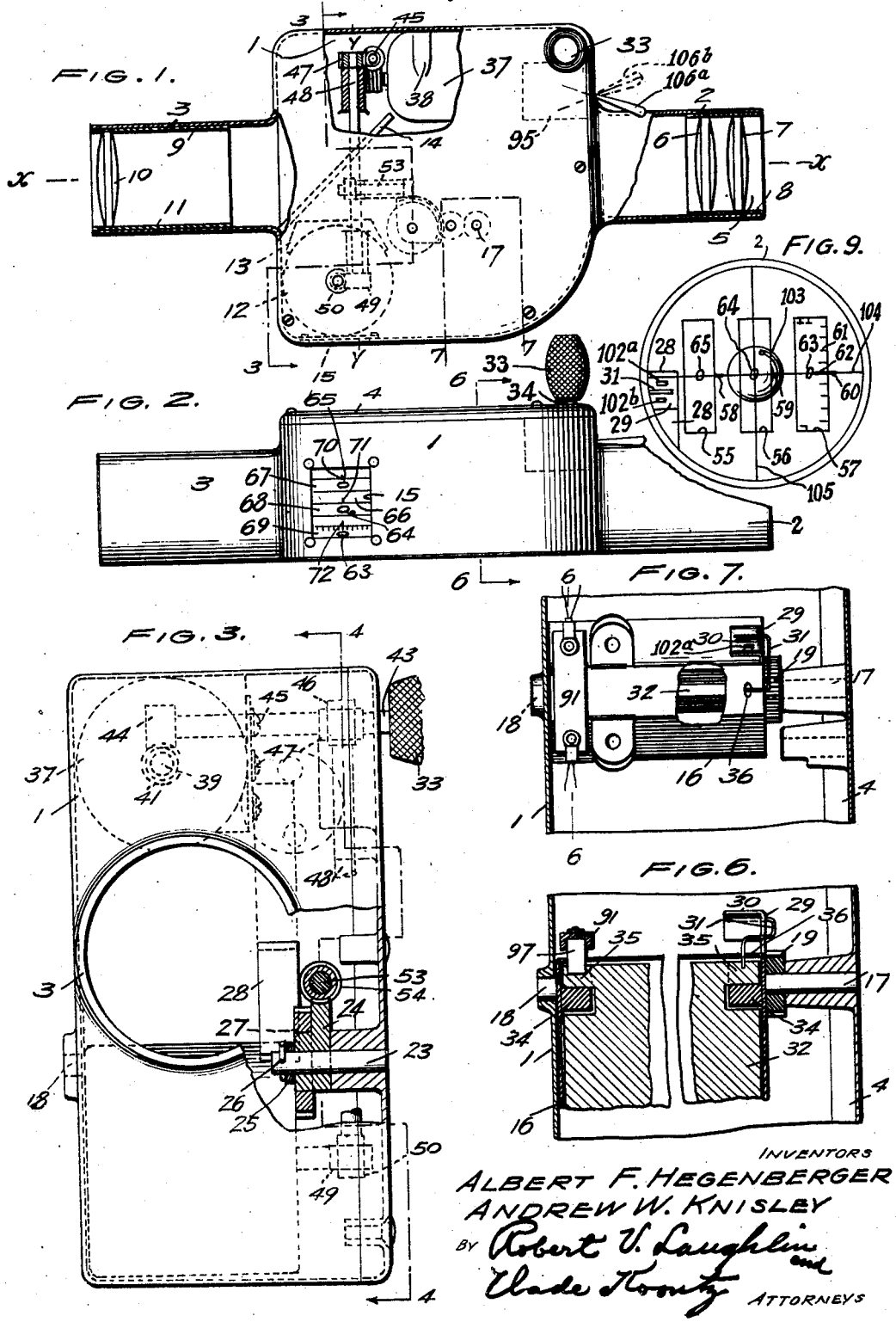

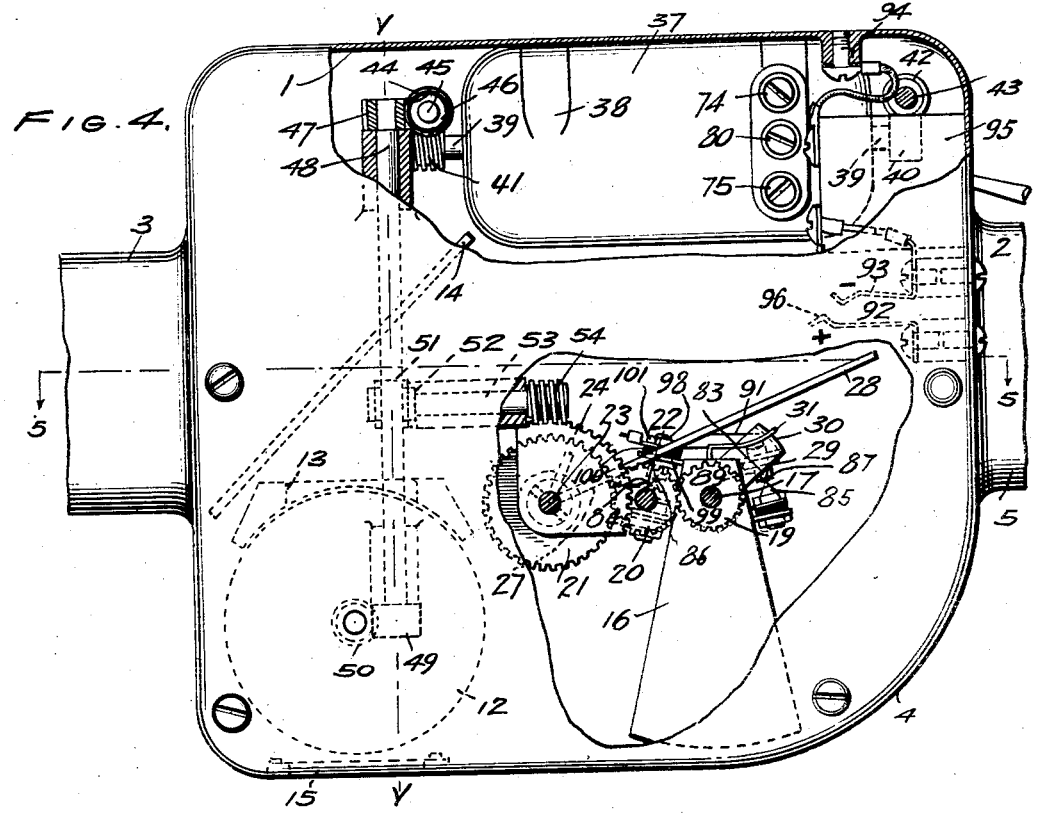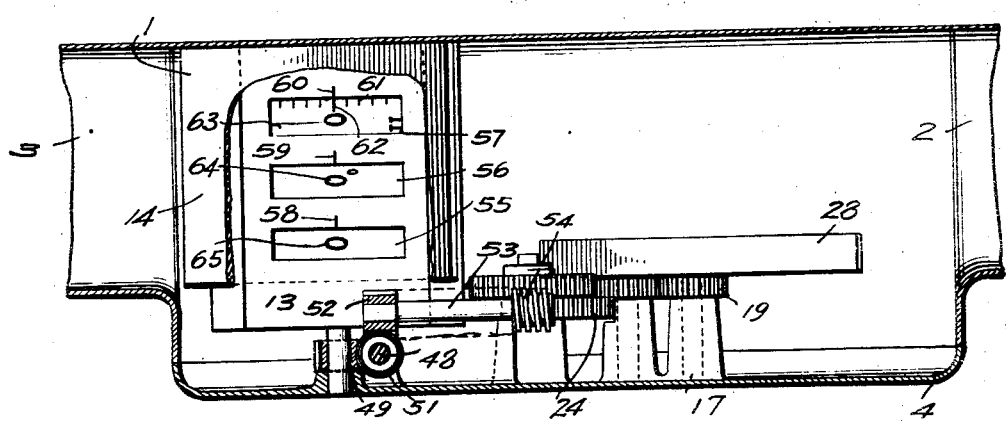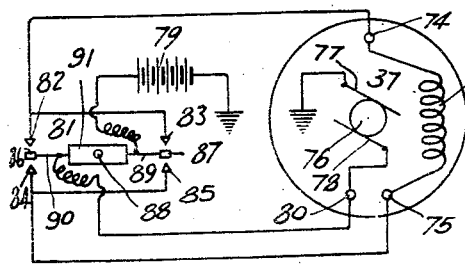

2,088,597

UNITED STATES PATENT OFFICE 2,088,597

SEXTANT

Albert F. Hegenberger, Riverside, Calif., and Andrew W. Knisley, Dayton, Ohio

Application July 1, 1936, Serial No. 88,412

7 Claims. (Cl. 88—2.2)

(Granted under the act of March 3, 1883, as amended April 30, 1928; 370 O. G. 757)

The invention described herein may be manufactured and used by or for the Government for governmental purposes without the payment to us of any royalty thereon.

This invention relates to instruments especially adapted for use in measuring angles and more particularly to instruments generally known as sextants or octants, depending upon the maximum angle which can be measured.

It is a principal object of our invention to provide a simple and practical instrument of the character described whereby the angular altitude of any elevated object may be determined quickly, conveniently, and with a high degree of accuracy.

Another object of our invention is to reduce to a minimum the possibility of inadvertently observing the wrong body, through employment of direct alignment between the observer's eye, the longitudinal axis of the telescope and the specific body under observation.

A further object of our invention is to provide an instrument of the character described which requires employment of but one hand to accomplish observation of a desired body.

We have further provided, through the use of both hands, for auxiliary manual adjustment of our instrument.

Our invention also makes possible immediate or delayed reading of the angular altitude of the body referred to in the preceding paragraphs.

In our invention we have further accomplished great simplicity in the number and operation of working parts, to the end that we have produced an instrument compact in form, light in weight, and entirely automatic in its operation.

With the foregoing and other objects in view, which will appear as the description proceeds, the invention consists of certain new and novel improvements in sextants which will be hereinafter more fully illustrated and described in the accompanying drawings and more particularly pointed out in the appended claims.

Referring to the drawings, in which numerals of like character designate similar parts throughout the several views:

Fig. 1 is a side view of our invention in partial cross-section.

Fig. 2 is a plan view of the bottom of our invention.

Fig. 3 is an enlarged front end view, partially in cross-section, taken on the line 3—3 of Fig. 1.

Fig. 4 is an enlarged partial side view of our invention, partly in cross-section, taken on the line 4—4 of Fig. 3.

Fig. 5 is a cross-sectional view taken on the line 5—5 of Fig. 4.

Fig. 6 is a cross-sectional view taken on the line 6—6 of Fig. 2.

Fig. 7 is a cross-sectional view taken on the line 7—7 of Fig. 1.

Fig. 8 is a wiring diagram of the electrically controlled elements of our invention.

In Figs. 1 and 2 a housing 1 is provided with tubular portions 2 and 3 co-axially located upon a horizontal axis $x$—$x$ and a cover plate 4. Tubular portion 2 is provided with an eye-piece 5 composed of lenses 6 and 7 mounted in a housing 8, while the forward tubular portion 3 is provided with a telescopic objective 9 composed of a lens 10 mounted in a housing 11. The housing 1 is provided with a counting mechanism 12, including a mask 13 with three equally-spaced openings positioned parallel to axis $x$—$x$ (see Fig. 5). The aforesaid parts are symmetrically disposed about a vertical axis $y$—$y$, intersecting the axis $x$—$x$ and positioned normal thereto. A plane glass reflector 14 is positioned such that the point of intersection of the axes $x$—$x$ and $y$—$y$ lies in the mirrored aft surface thereof, which surface is further tilted at an angle of forty-five degrees to both of the aforesaid axes. As viewed in Fig. 2, the lower portion of the housing 1 is provided with a single continuous opening 15, identical in outer contour to the over-all configuration to the three openings provided in the mask 13 and shown in Fig. 5. Six discs of the counting mechanism 12 are so disposed with reference to a hereinafter described mask placed beneath the opening 15 and with further reference to the three openings provided in the mask 13 that identical readings are recorded by the aforesaid counting mechanism 12 when viewed either through the eye-piece 5 or through the opening 15 provided in the under portion of the housing 1. Details as to disc construction and the interpretation of their reading will be dealt with below.

Referring to Figs. 3, 4, 6 and 7, a pendulum housing 16 is rotatably secured to the housing 1 by means of journals 17 and 18. The outer extremity of the journal 17 is provided with a fixed gear 19, held in operable engagement with gears 20 and 21 rotatably secured to the cover 4 by means of fixed journals 22 and 23. A worm segment 24 is fixed to the outer surface of the gear 21, the assembled parts being fixed laterally with reference to the cover 4 by means of a C-shaped washer 25 and a pin 26 fixed to the inner extremity of the journal 23. One half of the inner face of the gear 21 is provided with a slot 27 within which is fixedly secured a mirror 28. It will be noted that the upper right-hand portion of the housing 16 is provided with an L-shaped lug 29 with axis of symmetry rearwardly inclined towards the eye-piece 5 of the tubular portion 2. The polished surface of the mirror 28 is similarly inclined towards the eye-piece 5 with angle of incidence to the axis $x$—$x$ one-half magnitude of that formed between the axis of symmetry of the lug 29 and the axis $x$—$x$. As long as a ratio of two-to-one is maintained between the gear 21 and similar gears 20 and 19, reflected prolongation of the axis of symmetry of the lug 29 in the mirror 28 will always lie parallel to the axis $x$—$x$.

As viewed in Fig. 7, the mid-portion of the upturned face of the lug 29 is provided with two minor spaced graduations 102a and 102b symmetrically disposed about a central graduation 30, intersecting and lying normal to the axis of symmetry of the lug 29.

As shown in Figs. 4 and 7, the outer tip of a wire pointer 31 is so positioned with reference to the graduation 30 that the former will appear in coincidence with the latter when viewed through the eye-piece 5. The inner extremity of the wire 31 is fixed to a free pendulum 32 such that as long as the axis of symmetry of the housing 16 is maintained parallel to the vertical axis $y$—$y$, as viewed in Fig. 4, any deviation of the latter axis from "true vertical" will cause misalignment of the outer extremity of the wire pointer 31 with the graduation 30, thus indicating that the housing 1 is no longer being held in "true horizontal". A further important fact is indicated by the aforesaid misalignment, that is, that the axis of symmetry of the aforesaid pendulum 32 has moved out of coincidence with the axis of symmetry of the housing 16, as viewed in Fig. 4. Thus, regardless of the upward tilt of the housing 1 during observation of celestial bodies, through proper adjustment of the gear-chain 19, 20 and 21, the aforesaid axes of symmetry may be readily adjusted into coincidence. Through further employment of a knob 33 and suitable interconnecting gearing mechanism, it is possible to definitely record upon the counter 12 that angle of divergency of the axis of symmetry of the housing 16 which is required to place the axis of symmetry of the pendulum in coincidence therewith and thus indicate the angle of divergency of the axis $x$—$x$ from "true horizontal" during observation of any predetermined celestial body or the like.

Figs. 6 and 7 show in detail the manner of mounting a pendulum 32 within the housing 16. The upper outer ends of the housing 16 are provided with knife-blocks 34 having V-shaped slots within which rest knife-blade portions 35 of the pendulum 32. Referring to Figs. 6 and 7, it will be seen that an opening 36 is provided in the upper right-hand portion of the housing 16 for egress of the indicating wire 31, the inner extremity of which is fixed to knife portion 35. Certain additional elements shown in Figs. 6 and 7 will be referred to hereinafter.

Adjustment of gear-chain 19, 20 and 21 may be effected either manually or automatically. Referring to Fig. 4, a small reversible motor 37 is secured to the upper surface of the housing 1 by means of mounting lugs 38. An armature shaft 39 is provided at its aft extremity with a helical gear 40 and at its forward extremity with a helical gear 41. The gear 40 is in operable engagement with a helical gear 42 fixed to the inner extremity of a shaft 43. Figs. 1 and 2 show the knob 33 fixed to the outer extremity of the shaft 43. The gear 41 is meshed with a helical gear 44 fixed to the inner end of a driven shaft 45. The outer extremity of the shaft 45 is provided with a helical gear 46 adapted to operatively engage a vertically disposed helical gear 47 fixed to the upper extremity of a second driven shaft 48. The lower extremity of the vertically disposed shaft 48 is provided with a helical gear 49 operatively engaging a helical gear 50 secured to the outer extremity of the counter 12, as shown in Fig. 3.

Since the physical characteristics of the individual gears comprising the hereinabove-described gear-chain are identical, a one-to-one gear ratio obtains for secondary rotation of the counter 12 by means of primary rotation of the knob 33. The mid-portion of the vertical driven shaft 48 is provided with a helical gear 51 adapted to operatively mesh with a second gear 52 mounted on a cross-shaft 53. The pitch of the aforesaid gears has been so selected that eight rotations of the vertical driven shaft 48 are required to effect one complete rotation of the cross-shaft 53. The rear extremity of the cross-shaft 53 is provided with a helical gear 54. A ratio of forty-five revolutions to one revolution is maintained between the helical gear 54 and the worm segment 24 such that three-hundred and sixty revolutions of the horizontal driven shaft 48 are required to effect one complete revolution of the gear assembly 24, 21. Since but one revolution of gear 21 is required to effect two revolutions of the gears 20, 19 and the housing 16, it is now evident that 180 revolutions of the knob 33 will be required to effect one complete revolution of the housing 16 about the journals 17 and 18.

During normal operation of a sextant, the alignment of its longitudinal axis varies from true horizontal to approximate vertical, i. e., a range of zero to ninety degrees angular altitude. Therefore, each turn of the knob 33 will effect a one-half degree "misalignment" correction of the axis of symmetry of the housing 16 with reference to "true vertical" of the freely hanging pendulum 32. If reference be made to the counter 12 of Figs. 2 and 5, it thus follows that the aforesaid knob adjustment will bring about six graduation changes of five minutes magnitude each, as more fully described below.

In Fig. 5, the central portion of the plane glass reflector 14 has been broken away sufficiently to indicate that the mask 13 is provided with three equally-spaced openings 55, 56, and 57. In Figs. 5 and 9 graduation marks 58, 59, and 60 are provided on the closed portions of the mask 13, in plan coincident to the longitudinal axis of the counter 12, to the immediate "right" of the sextant user while looking through the eye-piece 5, as shown diagrammatically in the latter figure. The disc portion of the counter 12 lying immediately beneath the opening 57 is provided with minute graduations 61 and five minute graduations 62. It will be noted that numerals 63 (totaling twelve in number) are provided to the immediate left of each of the five-minute graduations 62 for ready identification of the latter as the same come into progressive registration with the indicator mark 60. The disc portions lying immediately beneath openings 56 and 55 are provided with ten equally spaced numerals 64 and 65, respectively. The numerals 64 characterize the first digit of a series of angular altitude readings ranging from zero to ninety degrees. The numerals 65 characterize the second digit of the aforesaid series of angular altitude readings. One complete revolution of the disc portion lying immediately beneath the opening 57 will effect one-tenth revolution of the disc portion lying beneath the opening 56. In like manner, one complete revolution of the disc portion lying beneath the opening 56 will effect one-tenth revolution of the disc portion beneath the opening 55. There is thus an operative relationship between the movement of the pendulum housing 16 and the various disc elements of the counter 12, permitting exact knowledge of the angle of deviation of the axis $x$—$x$ from true horizontal during the observation of a predetermined celestial object 103 in the manner shown in Fig. 9. If desired, hair lines 104 and 105 may be suitably inscribed upon the near surface of the plane glass reflector 14. Since all of the numerals and degree marks of Fig. 5 are viewed by inversion through the plane glass reflector 14, it will be noted that the foregoing appear "upside-down" when viewed directly through the cut-away portion of the aforesaid reflector. In Fig. 9, a mirrored reflection of the wire pointer 31, superimposed upon central graduation 30; the two minor spaced graduations 102a and 102b, and the top portion of the lug 29 are shown in the mirror 28, to the left of the opening 55. From the reading indicated, the celestial object 103 is at zero elevation.

If Fig. 2 be viewed with the tubular portion 2 held uppermost, a "direct reading" duplicate of the numerals and degree marks of Fig. 5, will be observed. The opening 15 in the housing 1 is sealed by a masked cover glass 66 provided with three equally-spaced openings 67, 68 and 69.

Graduation marks 70, 71 and 72 are provided on the non-transparent portions of the cover glass 66. Since the latter conceal the three counter discs shown in Fig. 5, each of the graduation marks 70, 71 and 72 appear to the left (instead of the right) of the minute graduations 61, the five minute graduations 62 and the numerals 63, 64, and 65.

Electrical operation of our invention may best be understood by preliminary reference to Fig. 8. The small reversible motor 37 is diagrammatically represented as containing a field 73 terminating in terminals 74 and 75, an armature 76, and brushes 77 and 78. It should be noted that one pole of a battery 79 and the outer extremity of the brush 77 have a common ground in the housing 1 of our invention. The outer extremity of the remaining brush 78 terminates in terminal 80, while the remaining pole of the battery 79 is connected to a two-pole, double-throw switch 81.

The switch 81 forms a part of and is carried by the pendulum housing 16. In Fig. 8, contacts 82, 83, 84 and 85 are diagrammatically represented as fixed (with reference to the pendulum housing 16) and two-way contacts 86 and 87 as pivoted about a point 88, i. e., the bottoms of knife-blade portions 35 of the pendulum 32.

The two-way contacts 86 and 87 are resiliently mounted in relation to one another by means of mounting springs 89 and 90 and an insulating block 91. Terminal 82 is connected in common to terminals 74 and 83, while terminals 84 and 85. Mounting spring 89 is connected to the ungrounded pole of the battery 79, the remaining mounting spring 90 being connected to terminal 80 of the motor 37. From the foregoing, it is at once evident that if clockwise movement of the insulating block 91 induces current flow from the battery 79 to the terminal 75, then counter-clockwise movement of the insulating block 91 will induce reversed current flow from the battery 79 to the terminal 74, thereby simultaneously reversing direction of turn of the armature 76.

Figs. 4, 6, and 7 show actual disposition of parts diagrammatically represented in Fig. 8. Referring to Fig. 4, negative terminal 93 of a jack 92 is grounded to a boss 94 of the housing 1, through a toggle switch 95. The positive terminal 96 of the jack 92 is connected to the C-shaped mounting spring 89, shown in Fig. 4. It will be noted that the insulated block 91 supporting mounting springs 89 and 90 is fixed to the knife blade portion 35 of the pendulum 32 by means of a vertical support 97. Each of the contacts 82, 83, 84, and 85 are backed with a threaded portion 98. The threaded portions 98 are supported and adjusted by means of mounting lugs 99, insulator blocks 100 and check nuts 101. Electrical interconnection between the small reversible motor 37, the C-shaped mounting spring 90, and the threaded portions 98 of contacts 82, 83, 84, and 85 is effected as indicated in Fig. 8.

Two methods may be used for obtaining the true elevation of a celestial or other object. The sextant is hand elevated until the common axis of the tubular portions 2 and 4, thereof, is aligned with the object under observation. Assuming previous zero setting of the counter 12, an observer will thereupon visualize a duplication of Fig. 9, with the single exception that the wire pointer 31 will be superimposed upon the graduation 102a, and not upon the central graduation 30, to which it must be returned if the axes of symmetry of the freely hanging pendulum 32 and the pendulum housing 16 are to be brought into common coincidence with "true vertical."

The first method of returning the wire pointer 31 into superimposed coincidence with the central graduation 30 consists simply in shifting the handle of the toggle switch 95 from position 106a to position 106b, as shown in Fig. 1. The electrical operation involved is fully covered, hereinabove, in connection with the description of Fig. 8.

The second method of returning the wire pointer 31 into coincidence with the central graduation 30 consists of manually turning the knob 33 in a manner fully discussed hereinabove. Each turn of the knob 33 effects a one-half degree "misalignment" correction of the axis of symmetry of the housing 16 with reference to "true vertical" of the freely hanging pendulum 32. Thus, assuming the celestial object 103 to lie at a 15 degree elevation to true horizontal, thirty turns of the knob 33 will return the wire pointer 31 into coincidence with the central graduation and simultaneously indicate a reading of 15 degrees and no minutes upon the face of the counter 12.

We claim:

1. In a sextant having a housing and a biportioned means for simultaneously producing images of an observed object and the reading of its elevation above the horizon in a common focal plane, a pendulum, a supporting means for said pendulum rotatable with respect to said housing, means associated with said pendulum and said pendulum supporting means for effecting a predetermined relation between said pendulum and said supporting means for any angular displacement of said housing, and means associated with said pendulum supporting means for indicating the relative angular change between said pendulum supporting means and said housing.

2. In a sextant having a housing and a bi-portioned means for simultaneously producing images of an observed object and the reading of its elevation above the horizon in a common focal plane, a pendulum, a supporting means for said pendulum rotatable with respect to said housing, electric power driven means associated with said pendulum and said pendulum supporting means for effecting a predetermined relation between said pendulum and said supporting means for any angular displacement of said housing, and means associated with said pendulum supporting means for indicating the relative angular change between said pendulum supporting means and said housing.

3. In a sextant having a housing and a bi-portioned means for simultaneously producing images of an observed object and the reading of its elevation above the horizon in a common focal plane, a pendulum, a housing pivotally supporting said pendulum and rotatively mounted in said first-mentioned housing, a reversible motor adapted to be electrically connected to and operated by said pendulum, said motor being responsive to relative displacements between said pendulum and said first-mentioned housing to cause equal and opposite rotation of said pendulum housing relative to said first-mentioned housing, and means associated with said pendulum housing for indicating the relative angular change between said housings.

4. In a sextant having a housing and a bi-portioned means for simultaneously producing images of an observed object and the reading of its elevation above the horizon in a common focal plane, a pendulum, a housing pivotally supporting said pendulum and rotatively mounted in said first-mentioned housing, a reversing switch carried by said pendulum housing and responsive to movements of said pendulum, a reversible motor adapted to be connected to said switch such that said pendulum housing is caused to rotate in an equal and opposite direction to each relative displacement between said pendulum and said first-mentioned housing, and means associated with said pendulum housing for indicating the relative angular change between said housings.

5. In a sextant having a housing and a bi-portioned means for simultaneously producing images of an observed object and the reading of its elevation above the horizon in a common focal plane, a pendulum, a supporting means for said pendulum rotatable with respect to said housing, means to cause said pendulum supporting means to rotate in an equal and opposite direction to each relative displacement between said pendulum and said housing, and means associated with said pendulum supporting means for indicating the relative angular change between said pendulum supporting means and said housing.

6. In a sextant having a housing and a bi-portioned means for simultaneously producing images of an observed object and the reading of its elevation above the horizon in a common focal plane, a pendulum, a supporting means for said pendulum rotatable with respect to said housing, means to cause said pendulum supporting means to rotate in an equal and opposite direction to each relative displacement between said pendulum and said housing, means associated with said pendulum and pendulum supporting means for indicating the relative angular dispositions therebetween, and means associated with said pendulum supporting means for indicating the relative angular change between said pendulum supporting means and said housing.

7. In a sextant having a housing and a bi-portioned means for simultaneously producing images of an observed object and the reading of its elevation above the horizon in a common focal plane, a pendulum, a supporting means for said pendulum rotatable with respect to said housing, automatic means associated with said pendulum and said pendulum supporting means for effecting a predetermined relation between said pendulum and said supporting means for any angular displacement of said housing, and means associated with said pendulum supporting means for indicating the relative angular change between said pendulum supporting means and said housing.

ALBERT F. HEGENBERGER.
ANDREW W. KNISLEY.